US012448957B2

(12) United States Patent
Kahan et al.

(10) Patent No.: US 12,448,957 B2
(45) Date of Patent: Oct. 21, 2025

(54) DUAL MOTOR PUMP ASSEMBLY

(71) Applicant: Shawn Kahan, Dorval (CA)

(72) Inventors: Shawn Kahan, Dorval (CA); Sun Weiguo, Ningbo (CN); Zhang Shikun, Ningbo (CN); Dong Qianqin, Ningbo (CN); Yan Fengjie, Ningbo (CN); Yang Chuan, Ningbo (CN)

(73) Assignee: Shawn Kahan, Dorval (CA)

( * ) Notice: Subject to any disclaimer, the term of this patent is extended or adjusted under 35 U.S.C. 154(b) by 93 days.

(21) Appl. No.: 18/491,933

(22) Filed: Oct. 23, 2023

(65) Prior Publication Data

US 2025/0129774 A1 Apr. 24, 2025

(51) Int. Cl.

*F04B 23/06* (2006.01)
*B08B 3/02* (2006.01)
*F04B 17/03* (2006.01)
*F04B 53/10* (2006.01)

(52) U.S. Cl.

CPC .............. *F04B 23/06* (2013.01); *B08B 3/026* (2013.01); *F04B 17/03* (2013.01); *F04B 53/10* (2013.01); *B08B 2203/0223* (2013.01); *B08B 2203/0247* (2013.01)

(58) Field of Classification Search

CPC .......... F04B 23/06; F04B 17/03; F04B 53/10; F04B 49/035; F04B 49/22; F04B 49/24; B08B 3/026; B08B 2203/0223; B08B 2203/0247; B08B 3/02

USPC ......... 417/415, 62, 251, 252, 253, 288, 213; 239/574, 396; 137/565.35

See application file for complete search history.

(56) References Cited

U.S. PATENT DOCUMENTS 1,049,894 A * 1/1913 Merrill .................. F04B 49/007 415/28
1,523,342 A * 1/1925 Hart ...................... F04B 49/007 417/62
1,600,384 A * 9/1926 Aikman .................. F04B 35/00 417/225
2,218,565 A * 10/1940 Vickers ................. F04B 49/007 417/253
2,532,856 A * 12/1950 Ray .......................... F01M 1/18 417/252
3,565,555 A * 2/1971 Akjashi .................. F02M 37/16 417/435
3,746,027 A * 7/1973 Elliott ....................... F17D 1/14 137/268
4,009,971 A * 3/1977 Krohn ..................... F04B 17/03 417/415

(Continued)

*Primary Examiner* — Mark A Laurenzi
*Assistant Examiner* — Benjamin Doyle
(74) *Attorney, Agent, or Firm* — Stites & Harbison, PLLC; David W. Nagle, Jr.

(57) ABSTRACT

A plunger pump includes a base and a motor. The base is provided with a first pump body and a second pump body. The flow rate of the first pump body is equal to the flow rate of the second pump body. The first pump body is connected to a first motor. The second pump body is connected to a second motor. The first pump body is equipped with an inlet channel, one end of the inlet channel is equipped with a common inlet port, the second pump body is equipped with an outlet channel, one end of the outlet channel is equipped with a common outlet port, the inlet channel is set on the side far from the first motor, and the outlet channel is set on the side far from the second motor.

17 Claims, 10 Drawing Sheets

(56) References Cited

U.S. PATENT DOCUMENTS 4,589,825 A * 5/1986 Schmidt .................. B08B 3/026 417/307
4,771,945 A * 9/1988 Martin ...................... B08B 3/02 239/13
4,832,580 A * 5/1989 Tsuyoshi ............... F04B 43/086 417/317
4,838,311 A * 6/1989 Vetter ..................... B05B 12/14 239/69
4,850,806 A * 7/1989 Morgan .................. F04B 37/14 417/205
4,850,828 A * 7/1989 Yonezawa ............... F04B 49/02 417/252
5,029,758 A * 7/1991 Chayer ................... B60S 3/044 239/588
5,067,654 A * 11/1991 Paige ...................... F04B 49/24 417/440
5,135,361 A * 8/1992 Dion ................... F04D 15/0072 417/2
5,529,460 A * 6/1996 Eihusen ................ F04B 49/022 417/20
5,671,889 A * 9/1997 Petty ......................... B05B 7/24 239/588
5,722,443 A * 3/1998 Marler ...................... B08B 3/02 134/201
5,735,461 A * 4/1998 Winther .................. B08B 3/026 137/115.15
5,800,136 A * 9/1998 Kurth .................... F04B 43/026 417/311
6,120,614 A * 9/2000 Damron .................. B08B 3/026 134/102.1
6,123,509 A * 9/2000 Hung ...................... F04B 49/03 137/881
6,210,492 B1 * 4/2001 Wilson, III ......... E01F 15/0484 134/34
7,077,160 B1 * 7/2006 Ratz ...................... F04B 49/065 137/565.33
8,632,021 B2 * 1/2014 Li .......................... F04B 17/03 239/419
11,118,588 B2 * 9/2021 Schlittler ................ F04D 13/14
2002/0122730 A1 * 9/2002 Dexter ...................... F04B 1/02 417/299
2004/0079411 A1 * 4/2004 Davis .................... F04B 49/035 137/115.16
2004/0164176 A1 * 8/2004 Vassanelli ............. F04B 49/035 137/563
2005/0167532 A1 * 8/2005 Williams ................ B08B 3/026 239/543
2006/0245941 A1 * 11/2006 Sharp .................... F04B 49/022 417/298
2006/0275146 A1 * 12/2006 Williams ................ B08B 3/026 417/234
2007/0258831 A1 * 11/2007 Irick ......................... F04B 5/02 417/534
2008/0245899 A1 * 10/2008 Parris ...................... F04B 17/05 417/364
2008/0257988 A1 * 10/2008 Hahn ...................... B08B 3/026 239/525
2010/0038292 A1 * 2/2010 Fike ........................ C02F 1/441 210/123
2010/0125969 A1 * 5/2010 Genna ..................... B08B 3/026 15/348
2011/0271985 A1 * 11/2011 Kubasiewicz .......... B08B 3/026 134/94.1
2012/0073670 A1 * 3/2012 Lymberopoulos ...... F16K 31/42 137/2
2013/0014843 A1 * 1/2013 Wright ................ A61M 60/126 137/599.01
2013/0291973 A1 * 11/2013 Linton .................... F04B 23/02 137/565.35
2015/0118065 A1 * 4/2015 Aoki ....................... F04B 23/04 417/253
2016/0157693 A1 * 6/2016 Hess ................... A47L 11/4011 15/322
2017/0361357 A1 * 12/2017 Raasch ............. B01F 25/31242
2018/0029056 A1 * 2/2018 Alexander ............ F02N 11/106
2018/0180039 A1 * 6/2018 Adler ...................... F04B 25/00
2018/0195510 A1 * 7/2018 Neumair ................. F04B 23/06
2021/0340985 A1 * 11/2021 Todal .................. F04D 27/0223
2022/0136496 A1 * 5/2022 Ownby ................... F04B 49/06 700/282
2023/0381829 A1 * 11/2023 Trinkle ................... B08B 3/026
2024/0207902 A1 * 6/2024 Trinkle ................... B05B 12/00
2024/0246121 A1 * 7/2024 Sauter ..................... B08B 3/026
2024/0399423 A1 * 12/2024 Shawver ................. B08B 3/026

* cited by examiner

FIG. 5
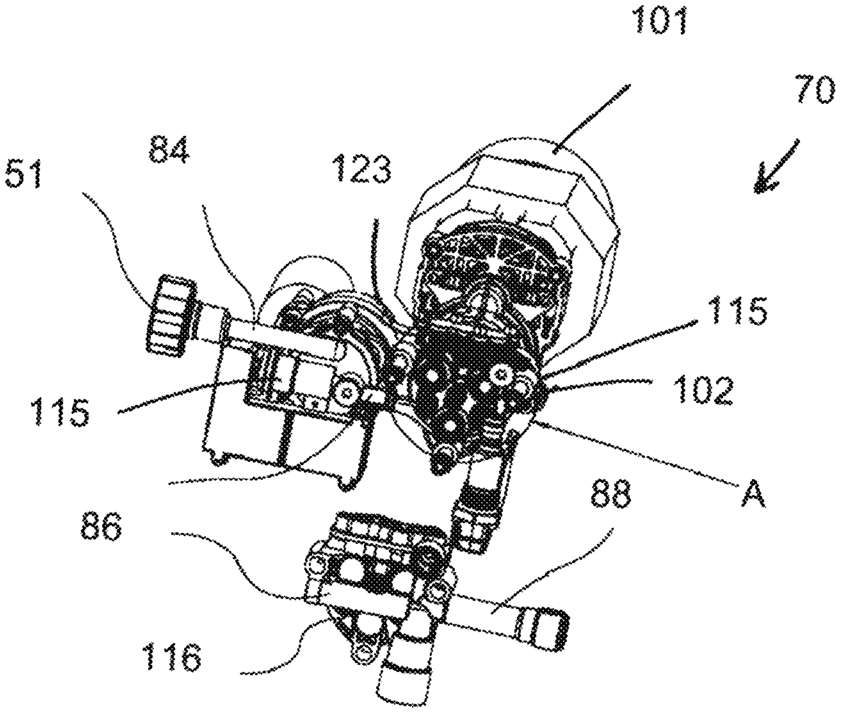
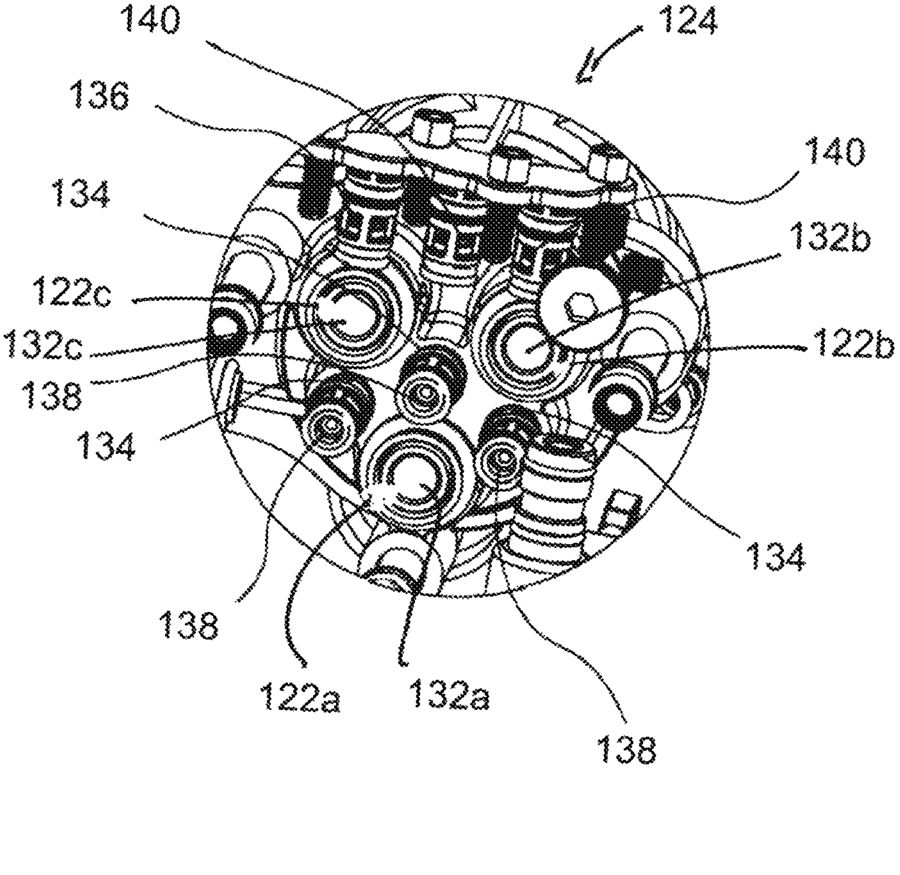
FIG. 6

FIG. 9
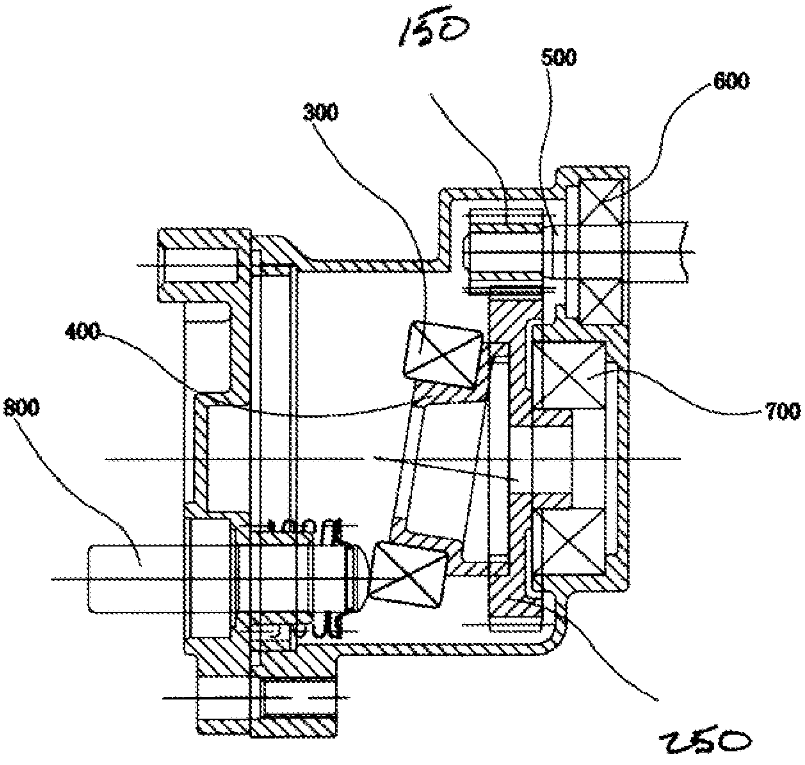
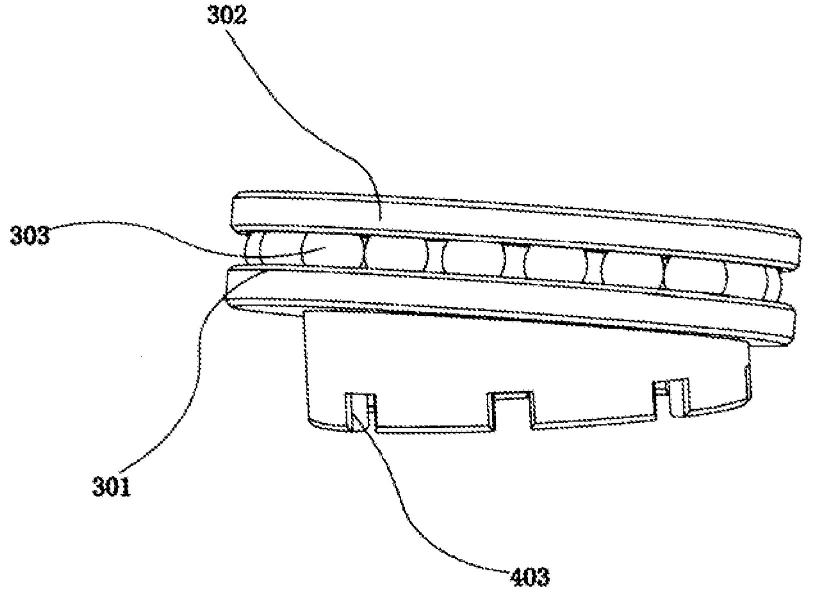
FIG. 10

DUAL MOTOR PUMP ASSEMBLY

TECHNICAL FIELD

The present disclosure relates to the field of fluid pump technology, and in particular to a pump assembly having two or more pump motors which are selectively activatable independently or in combination to provide output fluid flow at different selected pressures. More preferably, the invention relates to a dual motor pump assembly for use in a pressure washer or sprayer and which in preferred aspects, allows for the operation of pump motors using separate power sources.

BACKGROUND OF THE INVENTION

Pumps are mechanical devices that transport or pressurizes fluids and liquids, and which operate as an energy conversion devices that convert mechanical energy into fluid pressure energy. Pumps are usually used to output high-pressure liquids, transmitting mechanical energy or other external energy of the pump piston or impeller to increase energy of liquid. Typically, pumps are used to transport liquids such as water, oil, acid-base liquids, emulsion, and suspensions or slurries. It can also transport liquid, gas mixture and liquid containing suspended solids.

Plunger pumps are frequently used in hydraulic systems and rely on the reciprocating movement of a piston or plunger in a cylinder body to change the volume of the sealing working chamber to achieve high pressure fluid suction and pressure. Plunger pumps are typically powered by an electric motor which drives the gearbox to rotate through a drum shaped gear coupling. The gearbox decelerates and drives a crankshaft that converts rotary motion into a reciprocal motion. By using a crank connecting rod mechanism, a crankshaft is transformed into a reciprocating motion for a crosshead and plunger. Plunger pumps have the advantages of achieving higher rated pressure, compact structure, high efficiency, and convenient flow adjustment. Plunger pumps are widely used in high-pressure, high flow, and flow adjustment situations, such as hydraulic presses, engineering machinery, and ships.

In practical work, due to the complex working conditions faced by construction machinery, hydraulic systems often require two or more oil circuits to achieve adequate hydraulic control. Power components in hydraulic systems often adopt a dual pump series structure, where two single piston pumps are connected in series for providing adequate hydraulic fluid flow. Chinese Patent Application No. 202211627486.2 (CN11571121A) discloses a compact dual variable plunger pump arrangement for hydraulic fluid applications. The pump arrangement includes a front pump and a rear pump fixed and connected together through an intermediate body in an adjacent bottom-to-bottom manner. The intermediate body is formed with a common oil inlet, a front pump oil outlet and a rear pump oil outlet, front end positioning table, front end positioning cavity, rear end positioning table, and rear end positioning cavity. The bottom surface of the front pump housing of the front pump is sealed and pressed together with the front end positioning table. A front pump oil distribution plate of the front pump is pressed and installed in the front end positioning chamber. The bottom surface of the rear pump housing of the rear pump is sealed and pressed together with the rear end positioning table and the rear pump oil distribution plate of the rear pump is pressed and installed in the rear end positioning cavity. Typically, however, conventional dual variable piston pump constructions have complex structures and are cumbrance to move. As a result, such pump arrangements are typically limited to industrial applications and heavy machinery, where for example high-pressure hydraulic fluid flow may be required.

SUMMARY OF THE INVENTION

In one non-limiting construction, the present invention provides a dual motor pump assembly which includes at least two fluid pump motors which are selectively operable independently or in concert, to output pressurized fluid flows at differing selected pressures.

In one non-limiting construction, the pump assembly is preferably provided with a compact light weight arrangement which is suitable for use in power equipment, such as part of a pressure washer or sprayer, air or water pump, hydraulic lift and in powered tools, and most preferably in portable pressure washers.

In another non-limiting construction of the invention, the pump assembly may have two or more pump motors which are operable either independently or in tandem. While not essential, most preferably the pump assembly motors are independently powered by the same or different types of separate power sources such as DC batteries, AC household power, and/or fuel cell powered engines. Although not essential, the pump assembly preferably incorporates a pump assembly, and preferably plunger pump assembly, which is compact in structure and convenient in use and maintenance, and which is operable to output a pressurized fluid, and preferably liquid output flow. The plunger pump assembly preferably includes a base and at least two pump motors. The base is provided with first and second pump bodies which are each separately powered by an associated pump motor and adapted to output a selected pressured fluid flow rate during pump operation.

Although not essential, in one possible construction, the flow rate per unit area of the first pump body is equal to the flow rate per unit area of the second pump body. The motor assembly preferably includes a first motor and a second motor, wherein the first pump body is connected to the first motor, and the second pump body is connected to the second motor. Although not essential, most preferably the first motor is a battery powered DC motor. The second motor may be DC powered, but is most preferably a higher output AC powered motor. It is to be appreciated that in other possible constructions, fuel cell powered, AC and/or DC powered motors associated pump bodies in other combinations may also be provided. Suitable DC motors include brushed DC motors, as well brush-less DC motors.

Although not essential, the output power of the first motor is preferably equal to or less than that of the second motor. The pump assembly is equipped with a fluid conduit assembly and which includes an inlet conduit or channel, an outlet conduit or channel, and an intermediate conduit which fluidically communicates with the inlet conduit and outlet conduit. The inlet conduit is adapted to provide fluid communication between a fluid source and the first pump body. One end of the inlet channel is equipped with a common inlet port for receiving an input fluid flow at an initial input pressure. In a simplified construction, the common inlet port is configured for threaded engagement with a conventional garden hose coupling to receive a household water fluid as input fluid. The second pump body is provided in fluid communication with the outlet conduit. One end of the outlet channel is equipped with a common outlet port for connecting with a suitable output attachment used to deliver or utilize a higher pressurized output spray or fluid flow. The inlet conduit is set on the upstream side from the first motor, and the outlet conduit is set on the downstream side from the second motor, wherein liquid enters from the common inlet and exits from the common outlet port.

In one preferred embodiment, the first pump body is provided with a first channel, which is selectively connected to the first inlet conduit by way of a first valve. The second pump body is provided with a second channel which is selectively connected to the intermediate conduit by way of a second valve. In non-limiting embodiments the first and second valves may be provided as unloader valves, solenoid valves, electro-mechanical valves, or combinations thereof.

The second valve is preferably installed at the connection between intermediate conduit and the outlet conduit and controls the connection or blockage between the intermediate conduit and the outlet conduit. Preferably when the second valve is opened, the intermediate conduit is in direct fluidic connection to the outlet conduit allowing fluid flow to move directly therefrom through the outlet port when the second valved is closed, direct connection between the intermediate conduit and the outlet conduit is blocked, and liquid fluid flow enters the second pump body from the intermediate for pressurization therein conduit before entering the outlet conduit.

As a preferred embodiment, the first pump body includes a first end cover, which is arranged on a side far from the first motor. The liquid inlet conduit may be at least partially arranged on the first end cover, and may include a first channel at least partially arranged on or integrated with the first end cover.

As a preferred embodiment, the first pump body is provided with a first pump chamber, a first chamber inlet, and a first chamber outlet, both of which are located near the first end cover. The first chamber inlet is connected to the inlet conduit via a chamber inlet channel, and the first chamber outlet is selectively connectable to the intermediate conduit. The first pump chamber is preferably equipped with a first plunger, which reciprocates in the first pump chamber under the drive of the first motor. When the first plunger is activated by the first motor and the plunger moves in a direction of the first motor, the first chamber inlet through the first valve opens and liquid enters the first pump chamber via the inlet channel. When the first plunger moves in the direction of the first end cover, the first valve closes and the input fluid in the first pump chamber is pressurized to a first higher pressure. Typically, in pressure washer applications, the input fluid flow is initially received at the inlet part of the input conduit at a feed pressure of between about 10 and 50 PSI, depending on the municipal water source. In the first pump chamber, the first motor pressurizes the fluid flow to a higher pressure selected at between about 800 and 1400 PSI, however, pressurizations may be achieved depending on the fluid type and power equipment applications. The pressurized fluid in the first pump chamber is compressed into the first chamber outlet, flowing as a pressurized fluid flow from the first chamber outlet, and then enters the second channel.

Although not essential, preferably the inlet conduit includes a first bypass channel which, depending on the operation of the first valve, may permit fluid flow to bypass the first pump chamber and flow directly into the intermediate conduit.

In preferred embodiment, the second pump body includes a second pump chamber and second end cover, which is arranged on the side far from the second motor. The intermediate conduit may be at least partially arranged on or integrate with the second end cover.

The second pump chamber includes a second chamber inlet, and a second chamber outlet. The second chamber inlet is arranged near the second end cover, the second chamber outlet is arranged above the second end cover, and is selectively fluidically connected to the liquid outlet conduit. The second pump chamber is equipped with a second plunger. The second plunger reciprocates in the second pump chamber under the drive of the second motor. When the second plunger moves in the direction of the second motor under the drive of the second motor the second valve opens and liquid flowing in the intermediate conduit enters the second pump chamber from the second chamber inlet. As the second plunger moves in the reverse direction of the second end cover, liquid in the second pump chamber is further pressurized by the second plunger movement to a higher pressure than the pressure of the input of fluid flow moving through the intermediate conduit. Thus, the second pump may be used to either directly pressurize an input water flow which bypasses the first pump chamber as an output high pressure flow; or alternatively, depending on the operation of the first valve, the second pump may be used to further pressurize an initially pressurized flow moving from the first pump chamber as still a higher output pressure and preferably by an additional 100 to 1000 PSI depending on the fluid and input source. The liquid compressed in the second pump chamber moves via the second chamber outlet, and then enters the outlet conduit from the second chamber outlet and is discharged from the outlet port.

In another preferred embodiment, the intermediate conduit may include a bypass channel which depending on the operation of the second valve may permit fluid flow to bypass the second pump chamber and flow directly into the outlet conduit.

In another possible construction, the second pump chamber may have three fluid compression chambers, each having corresponding chamber inlet and chamber outlet.

As a preferred embodiment, one or both plunger pumps are equipped with a transmission mechanism, which includes a driving gear, a driven gear, and a cam. The driving gear is meshed with the driven gear, the driving shaft of the motor is connected to the driving gear, and the motor drives the driving gear to rotate, thereby driving the rotation of the driven gear. The cam is clamped with the driven gear, and the rotation of the driven gear drives the cam to rotate. The rotation of the cam drives the reciprocating movement of the plunger.

Preferably, the cam is equipped with a first plane bearing, and one end of the plunger contacts the first plane bearing. The first plane bearing moves with the rotation of the cam, and the first plane bearing drives the plunger to reciprocate.

As a preferred embodiment, the side of the driven gear disposed away from the cam is connected to a first deep groove ball bearing.

As a preferred embodiment, one side of the driven gear is provided with a connecting shaft, and the first deep groove ball bearing is provided in an interference fit with the connecting shaft. Furthermore, the side of the driven gear near the first deep groove ball bearing is provided with an inner concave surface, on which an annular convex block is arranged, and the connecting shaft is arranged on the annular convex block. The first deep groove ball bearing preferably includes a large ring structure and a small ring structure, and the large ring structure is arranged outside the small ring structure. The outer diameter of the annular convex block is greater than or equal to the outer diameter of the small ring structure.

As a preferred embodiment, the other side of the driven gear is provided with a groove, and the inner circumferential wall of the groove is provided with several limit protrusions. The side of the cam near the driven gear is provided with a first annular protrusion, and the first annular protrusion is provided with several second grooves. The second groove is matched with the limit protrusion to connect the cam with the driven gear.

As a preferred embodiment, the height of the first annular protrusion gradually decreases or increases in a radial direction.

As a preferred embodiment, the cam comprises a first part and a second part, which are integrally formed with the second part. The first part is a circular structure arranged on the second part, and the outer diameter of the circular structure is smaller than the outer diameter of the first circular protrusion. The first circular protrusion is arranged on the second part.

As a preferred embodiment, the first planar bearing includes a first annular member, a second annular member, and several spherical or ball bearings, which are evenly distributed between the first annular member and the second annular member. One side of the first annular member is attached to the second part of the cam, and the inner diameter of the first annular member is greater than or equal to the outer diameter of the annular structure, while the inner diameter of the second annular member is greater than the outer diameter of the annular structure. More preferably, a second deep groove ball bearing is arranged on the driving shaft of the motor.

Although not essential, the first and second pump bodies may share a common base, making the structure of the plunger pump more compact, simplifying manufacture and maintenance. Preferably, the two pump bodies are arranged fluidically in series and are only equipped with one common inlet and one common outlet, simplifying the layout of the entire system conduit and making the volume smaller. The first pump body and the second pump body preferably have an associated separate motor and which have relatively low requirements for the power of a single motor, lower losses during use, and increased energy-efficient.

Whilst the applicant has appreciated that the dual motor pump assembly is particularly suited for pressure washer or sprayer applications, the invention is not so limited. The applicant has appreciated that the dual pump motor assembly arrangement may be suited for a variety of different applications, including in other types of power equipment, as well as providing pressurized fluid flows in both air and hydraulic applications, including as fluid driven equipment and implements used in agricultural and construction equipment.

The present invention may thus include as one or more non-limiting aspects:

1. A pump assembly, and in a more preferred aspect, a pressure washer pump assembly comprising, first and second pump assemblies each having an associated pump chamber and being adapted to pressurize fluid therein, a conduit assembly for receiving a pressurized fluid flow therethrough, and first and second valve assemblies, the conduit assembly comprising a fluid inlet conduit, an intermediate conduit and a fluid outlet conduit, the fluid inlet conduit comprising: an inlet end adapted for fluid communication with a water source, providing a fluid flow at an input pressure, and an output end fluidically communicating with the first valve assembly, the first valve assembly including a first valve chamber and a first valve member, the actuation of the first valve member in the first valve chamber selectively communicating the output end of the inlet conduit and an inlet end intermediate conduit either directly, wherein the fluid flow is received in the intermediate conduit substantially at the input pressure, or via the first pump chamber whereby the activation of the first pump assembly pressurizes the fluid flow received in the intermediate conduit to a first pressure higher than the input pressure, an output end of the intermediate conduit fluidically communicating with the second valve assembly, the second valve assembly including a second valve chamber and a second valve member, the actuation of the second valve member in the second valve chamber selectively communicating the output end of the intermediate conduit and an inlet end of the fluid outlet conduit either directly, wherein the fluid flow is received in the fluid outlet conduit at substantially the same pressure as in the fluid flow in intermediate conduit, or via the second pump chamber whereby activation of the second pump assembly pressurizes the fluid flow received in the fluid outlet conduit to a second pressure higher than the pressure of the fluid flow in the intermediate conduit.
2. A plunger pump assembly, comprising a base and a motor, wherein the base is provided with a first pump body and a second pump body. The flow rate per unit area of the first pump body is equal to the flow rate per unit area of the second pump body, and the motor comprises a first motor and a second motor. The first pump body is connected to the first motor, and the second pump body is connected to the second motor. The power of the first motor is equal to or less than that of the second motor, and the first pump body is equipped with an inlet channel. One end of the inlet channel is equipped with a common inlet port, and the second pump body is equipped with an outlet channel. One end of the outlet channel is equipped with a common outlet port, and the inlet channel is located on the side far from the first motor. The liquid outlet channel is arranged on the side far from the second motor, and the liquid enters from the common inlet port and flows out from the common outlet port.
3. The assembly according to any of aspects 1 or 2, characterized in that the first pump body is provided with a first channel, the inlet channel is connected to the first channel, the outlet channel is provided with a second channel at one end far from the common outlet, and the first channel is inserted into the second channel.
4. The assembly according to any of aspects 1 to 3, characterized in that a first valve is arranged at the connection between the liquid outlet channel and the second channel, and the first valve controls the connection or blockage between the liquid outlet channel and the second channel. When the first valve is opened, the liquid outlet channel is connected to the connection of the second channel, and the liquid directly enters the liquid outlet channel from the second channel. When the first valve is closed, the connection between the liquid outlet channel and the second channel is blocked, and the liquid enters the second pump body from the second channel before entering the liquid outlet channel.
5. The assembly according to any of aspects 1 to 4, characterized in that the first channel is connected to an electromagnetic valve sensor, which is used to sense whether the liquid of the first pump body enters the first channel.

6. The assembly according to any of aspects 1 to 5, characterized in that the first pump body includes a first end cover, which is arranged on the side far from the first motor, the liquid inlet channel is at least partially arranged on the first end cover, and the first channel is at least partially arranged on the first end cover.

7. The assembly according to any of aspects 1 to 6, characterized in that the first pump body is provided with a first pump chamber, a first inlet, and a first outlet, both of which are located near the first end cover, the first inlet is connected to the inlet channel, the first outlet is connected to the first channel, and the first pump chamber is equipped with a first plunger. The first plunger is driven by a first motor and reciprocates in the first pump chamber. When the first plunger moves in the direction of the first motor, the liquid enters the first liquid inlet through the inlet channel, and the liquid enters the first pump chamber; When the first plunger moves in the direction of the first end cover, the liquid entering the first pump chamber is compressed into the first outlet, then enters the first channel from the first outlet, and then enters the second channel.

8. The assembly according to any of aspects 1 to 7, characterized in that the second pump body includes a second end cover, which is arranged on the side far from the second motor, the liquid outlet channel is at least partially arranged on the second end cover, and the second channel is at least partially arranged on the second end cover.

9. The assembly according to any of aspects 1 to 8, characterized in that the second pump body is provided with a second pump chamber, a second liquid inlet, and a second liquid outlet. The second liquid inlet is arranged near the second end cover, the second liquid outlet is arranged above the second end cover, the second liquid inlet is connected to the second channel, and the second liquid outlet is connected to the liquid outlet channel. The second pump chamber is equipped with a second plunger, which reciprocates in the second pump chamber under the drive of the second motor. When the first valve is closed, the second plunger moves towards the direction of the second motor under the drive of the second motor. The liquid in the second channel enters the second pump chamber through the second inlet port, and the second plunger moves towards the direction of the second end cover. The liquid entering the second pump chamber is compressed into the second outlet, and then enters the outlet channel from the second outlet, and is discharged from the common outlet.

10. The assembly according to any of aspects 1 to 9, characterized in that an intermediate conduit is arranged between the inlet conduit and the liquid outlet conduit, and the intermediate conduit is at least partially arranged on the second end cover. The liquid from the second liquid outlet first enters the intermediate conduit, and then enters the liquid outlet channel through the intermediate conduit.

11. The assembly according to any of aspects 1 to 10, characterized in that the plunger pump is equipped with a transmission mechanism, which includes a driving gear, a driven gear, and a cam. The driving gear meshes with the driven gear, and the driving shaft of the motor is connected to the driving gear. The motor drives the driving gear to rotate, thereby driving the driven gear to rotate. The cam is clamped with the driven gear, and the rotation of the driven gear drives the cam to rotate. The rotation of the cam drives the plunger to reciprocate.

12. The assembly according to any of aspects 1 to 11, characterized in that the cam is matched with a first plane bearing, and one end of the plunger is in contact with the first plane bearing. The first plane bearing operates with the rotation of the cam, and the first plane bearing drives the plunger to reciprocate.

13. The assembly according to any of aspects 1 to 12, characterized in that a first deep groove ball bearing is connected to the side of the driven gear away from the cam. One side of the driven gear is equipped with a connecting shaft, and the first deep groove ball bearing is in an interference fit with the connecting shaft. The side of the driven gear near the first deep groove ball bearing is provided with an inner concave, and an annular convex block is arranged on the inner concave. The connecting shaft is arranged on the annular convex block. The first deep groove ball bearing includes a large ring structure and a small ring structure, and the large ring structure is arranged outside the small ring structure. The outer diameter of the annular convex block is greater than or equal to the outer diameter of the small circular ring structure.

14. The assembly according to any of aspects 1 to 13, characterized in that the other side of the driven gear is provided with a groove, the inner circumferential wall of the groove is provided with several limit protrusions, the side of the cam near the driven gear is provided with a first annular protrusion, and the first annular protrusion is provided with several second clamping grooves. The second card slot is matched with the limit convex block to connect the cam with the driven gear.

15. The assembly according to any of aspects 1 to 14, characterized in that the cam comprises a first part and a second part, wherein the first part is integrally formed with the second part, and the first part is an annular structure arranged on the second part, with an outer diameter of the annular structure smaller than the outer diameter of the first annular protrusion, and the first annular protrusion is arranged on the second part.

16. The assembly according to any of aspects 1 to 15, characterized in that the first planar bearing comprises a first annular member, a second annular member, and a number of balls, wherein the balls are uniformly distributed between the first annular member and the second annular member, and one side of the first annular member is attached to the second part of the cam. The inner diameter of the first annular member is greater than or equal to the outer diameter of the annular structure, and the inner diameter of the second annular member is greater than the outer diameter of the annular structure.

17. The assembly according to any of aspects 1 to 16, wherein the first pump assembly includes a DC pump drive motor. In another aspect, the DC pump drive motor is a brushed DC motor or a brushless DC motor.

18. The assembly according to any of aspects 1 to 17, wherein the second pump assembly includes an AC pump drive motor.

19. The assembly according to any of aspects 1 to 18, wherein the first valve member comprises a mechanical loader valve, an electromagnetic valve or a solenoid valve.

20. The assembly according to any of aspects 1 to 19, wherein the second valve member comprises a mechanical loader valve, an electromagnetic valve or a solenoid valve.
21. The assembly according to any of aspects 1 to 20, wherein said first pump assembly comprises a plunger pump.
22. The assembly according to any of aspects 1 to 21, wherein the second pump assembly comprises a plunger pump.
23. The assembly according to any of aspects 1 to 22, further comprising a controller, the controller operable to concurrently activate the first pump motor concurrently when the first valve member is actuated to fluidically communicate the output end of the inlet conduit with the first pump chamber.
24. The assembly according to any of aspects 1 to 23, further wherein the controller is operable to concurrently activate the second pump motor concurrently when the second valve member to fluidically communicate the output end of the intermediate conduit with the second pump chamber.
25. The assembly according to any of aspects 1 to 24, further wherein the DC pump drive motor is battery powered.
26. A dual motor assembly, and most preferably a pressure washer pump assembly comprising, a first pump assembly and a second pump assembly, each of the first and second pump assemblies having an associated pump chamber and a pump motor operable to pressurize fluid therein, a conduit assembly for receiving a pressurized fluid flow therethrough, and first and second valve assemblies, and a controller operable to selectively control operation of the first pump assembly pump motor and the second pump assembly pump motor either independently or in tandem, the conduit assembly comprising a fluid inlet conduit, an intermediate conduit and a fluid outlet conduit, the fluid inlet conduit comprising: an inlet end adapted for fluid communication with a water source, providing a fluid flow at an input pressure, and an output end fluidically communicating with the first valve assembly, the first valve assembly including a first valve chamber; and valve operable with the selected activation of the first pump assembly pump motor to provide fluid communication with the intermediate conduit either directly with the inlet end with the inlet end wherein the fluid flow is received in the intermediate conduit substantially at the input pressure, or when the first pump assembly pump motor is activated, via the first pump chamber, whereby the activation of the first pump assembly pump motor pressurizes the fluid flow received in the intermediate conduit to a first pressure higher than the input pressure, an output end of the intermediate conduit fluidically communicating with the second valve assembly, the second valve assembly including a second valve chamber and valve operable with the selective activation of the second pump assembly motor to provide fluid communication with the fluid outlet conduit either directly, wherein the fluid flow is received in the fluid outlet conduit at substantially the same pressure as in the fluid flow in intermediate conduit, or when the second pump assembly pump motor is activated, via the second pump chamber, whereby activation of the second pump assembly pressurizes the fluid flow received in the fluid outlet conduit to a second pressure higher than the pressure of the fluid flow in the intermediate conduit.
27. The assembly according to any aspects 1 to 26, further wherein the first pump assembly pump motor is selected as a brushed DC motor or a brushless DC motor, and the second pump assembly pump motor comprises AC pump drive motor.
28. The assembly according to any aspects 1 to 27, wherein the first valve assembly valve is selected from the group consisting of a mechanical loader valve, an electromagnetic valve and a solenoid valve, and wherein the first valve assembly includes a check valve restricting return fluid flow from said intermediate into said fluid inlet conduit.
29. The assembly according to any aspects 1 to 28, further wherein the second valve assembly valve is selected from the group consisting of a mechanical loader valve, an electromagnetic valve and a solenoid valve, and wherein the second valve assembly includes a check valve restricting return fluid flow from said fluid outlet conduit into said intermediate conduit.
30. The assembly according to any aspects 1 to 29, further wherein said first pump assembly motor comprises a battery powered DC pump motor.
31. The assembly according to any aspects 1 to 30, further wherein said first pump assembly pump motor is selected to pressurize fluid in said first pump chamber to a first pressure range selected at between about 800 and 1,400 PSI, and said second pump assembly pump motor is selected to pressurize fluid in said second pump chamber to a second pressure range, whereby when fluid is received in said intermediate conduit at the input present the second pressure range being about 1,000 and 3,000 PSI and when fluid is received in said intermediate conduit at said first pressure, the second pressure range being about 800 to 2,000 PSI higher than the first pressure range.
32. The assembly according to any aspects 1 to 31, wherein the first pump assembly comprises a plunger pump actuable by the first pump assembly motor to pressurize fluid in said associates pump chamber to said first pressure range.

BRIEF DESCRIPTION OF THE DRAWINGS

The following will provide a further detailed description of the present application in conjunction with the accompanying drawings and preferred embodiments. However, those skilled in the art will understand that these drawings are only drawn for the purpose of explaining the preferred embodiments and therefore should not be used as a limitation on the scope of the present application. In addition, unless otherwise specified, the accompanying drawings only represent the composition or construction of the described object conceptually and may contain exaggerated displays, and the accompanying drawings are not necessarily drawn to scale.

FIG. 5 is a partially exploded view of a plunger pump used in the dual motor pump assembly of FIG. 3;

FIG. 6 is a partially enlarged view of the pump assembly shown in FIG. 5;

FIG. 9 is a cross-sectional view of the transmission mechanism shown in FIG. 8;

FIG. 10 is a structural schematic diagram of the connection between the first planar bearing and the cam used in the plunger pump of FIG. 7;

BRIEF DESCRIPTION OF THE PREFERRED EMBODIMENTS

The following is a detailed explanation of the present disclosure, combined with the accompanying drawings and embodiments. It should be understood that the specific embodiments described here are only used to explain best mode contemplated and are not intended as limiting.

Those skilled in the art should understand that in the disclosure of the present invention, the terms "vertical", "horizontal", "up", "down", "front", "back", "left", "right", "vertical", "horizontal", "top", "bottom", "inside", "outside", etc. indicate the orientation or position relationship based on the orientation or position relationship shown in the accompanying drawings, which is only for the convenience of describing the present invention and simplifying the description, Rather than indicating or implying that the device or component referred to must have a specific orientation, be constructed and operated in a specific orientation, the above terms cannot be understood as limiting the present invention.

Figure 1:
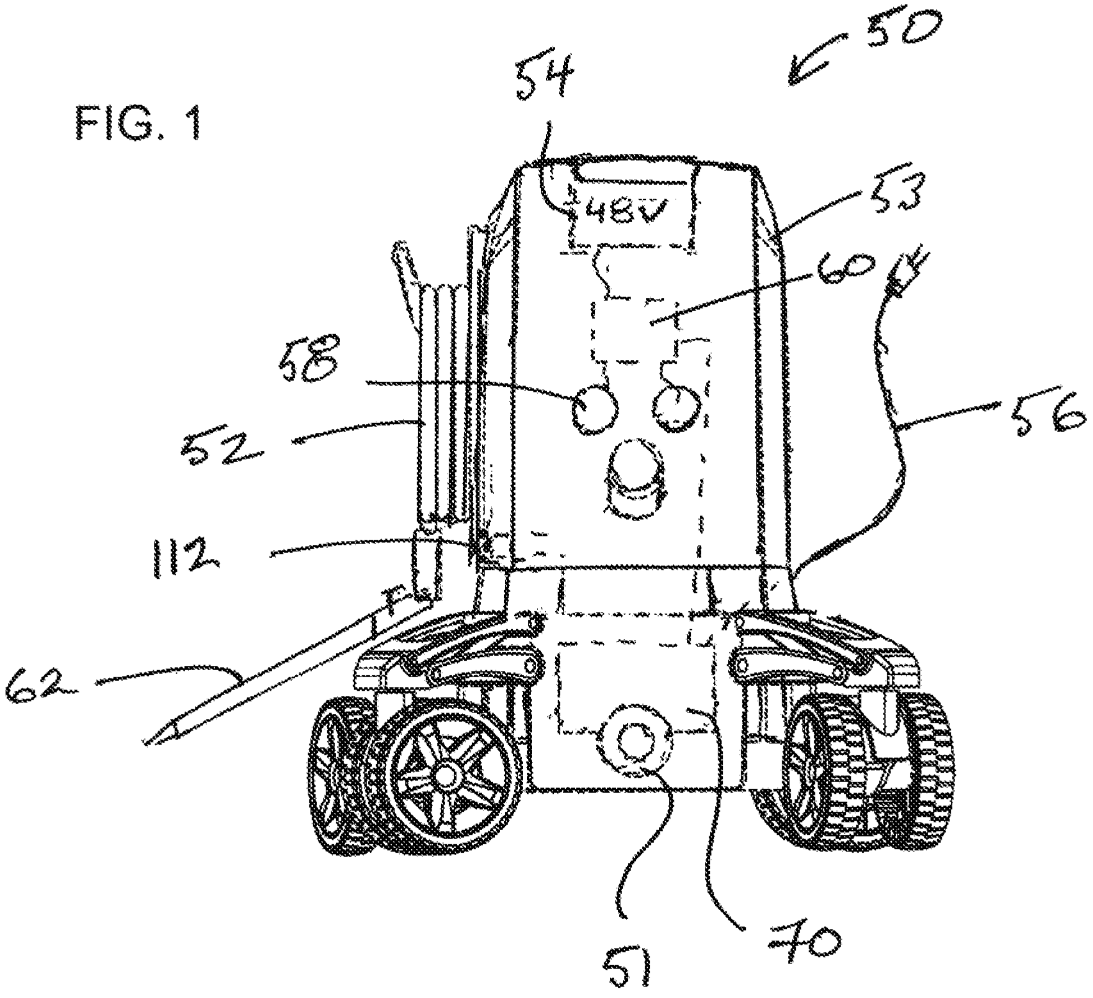
FIG. 1 illustrates schematically a portable pressure washer which incorporates a dual motor pump assembly in accordance with a preferred embodiment of the invention.

Reference may be made to FIG. 1 which illustrates a pressure washer 50 in accordance with preferred embodiment of the invention. The pressure washer 50 is of a portable design and includes a common fluid inlet port 51 and an outlet port 112, which fluidically communicates with a spray wand assembly 52. The inlet port 51 is mounted in a lower region of the washer housing 53 to fluidically connect to the outlet end of a conventional household water hose (not shown). The water hose thus acts as a water supply line for providing a source fluid flow. As will be described, the pressure washer 50 includes a dual motor pump assembly 70 which is adapted to operate under DC power, AC power, or in hybrid mode of both AC and DC power, depending on portability requirements and the desired pressure of the output spray. The pressure washer housing 53 is configured to electrically mount a detachable DC battery pack 54 which as will be described, is adapted to provide DC power in a first operational mode. The pressure washer furthermore includes, an AC power cord 56 adapted to receive conventional 120V household AC power from a household power source during washer operation in a second operational mode. A control panel 58 on the housing 53 electronically communicates with a controller 60 which is used to regulate power supply from the battery pack 54 and AC power source, and control a dual motor pump assembly 70 in the operation of the pressure washer 50. By the selective activation of the control panel 58, the pressure washer 50 may be operated in a DC only battery mode, an AC only powered mode, or a hybrid mode where power is supplied to the pump assembly 70 by both the battery pack 54 and via the AC power cord 56 to maximize output fluid flow pressure.

The pump assembly 70 is shown best in FIGS. 2 to 5. As will be described, the pump assembly 70 is adapted for fluidic connection to a household water supply line (not shown) such as a garden hose or municipal water supply. The pump assembly 70 operates to receive and pressurize an input water flow which is supplied at a first input pressure, and output a pressurized spray via a spray wand 52 (FIG. 1).

Figure 2:
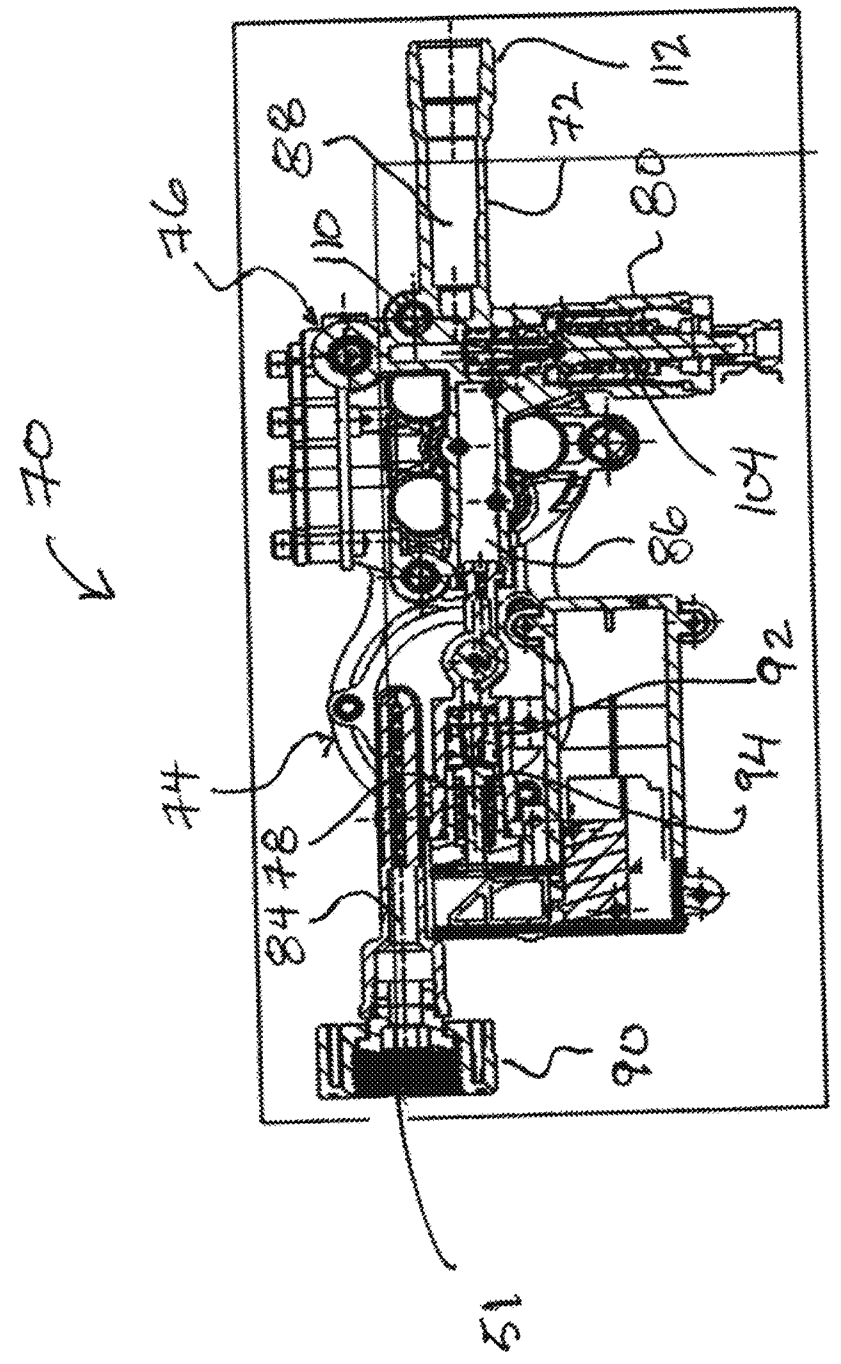
FIG. 2 shows a cross sectional view of a dual motor pump assembly used in the pressure washer shown in FIG. 1, in accordance with a preferred embodiment.
Figure 3:
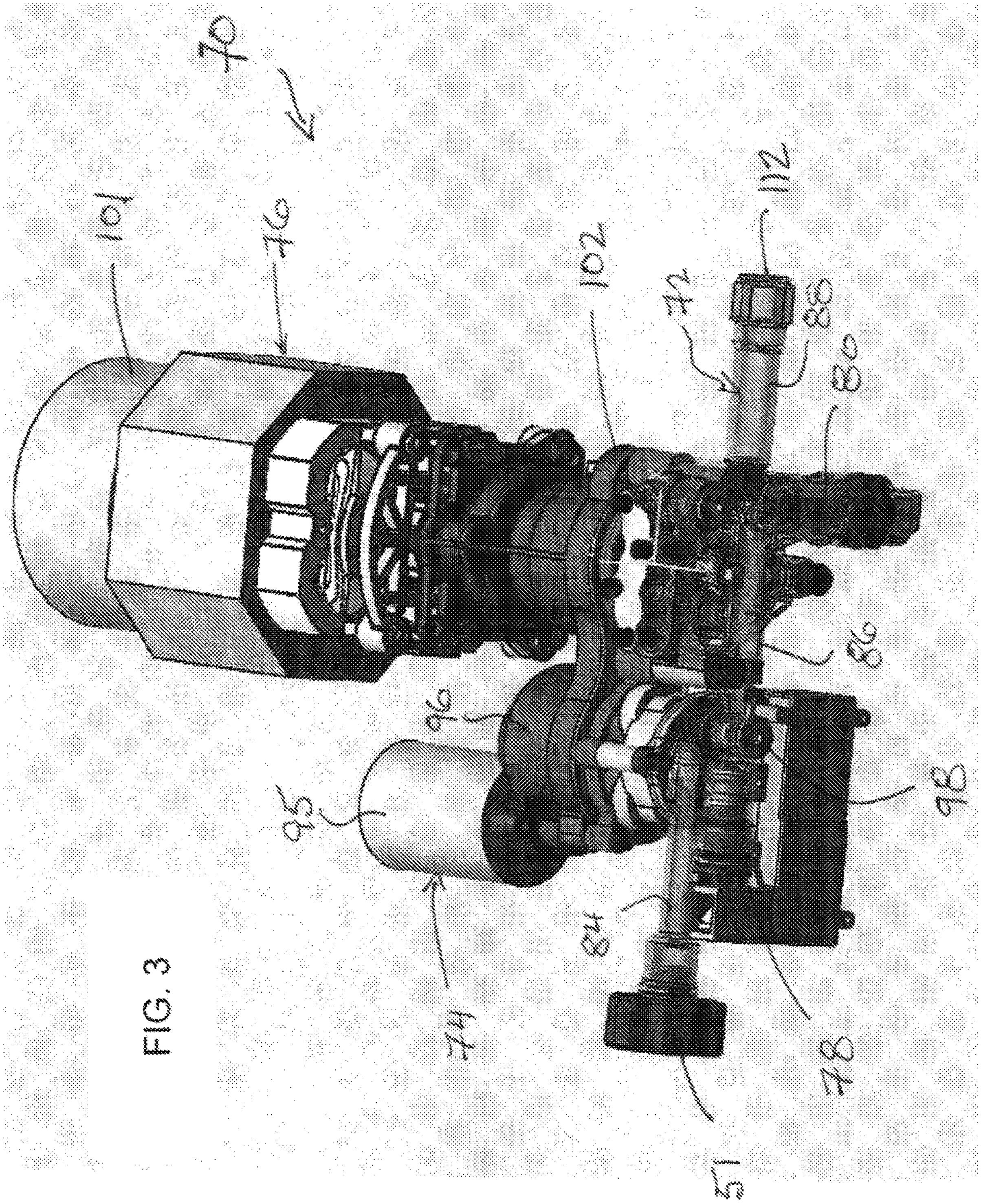
FIGS. 3 and 4 show perspective views of the dual motor pump assembly shown in FIG. 2.
Figure 4:
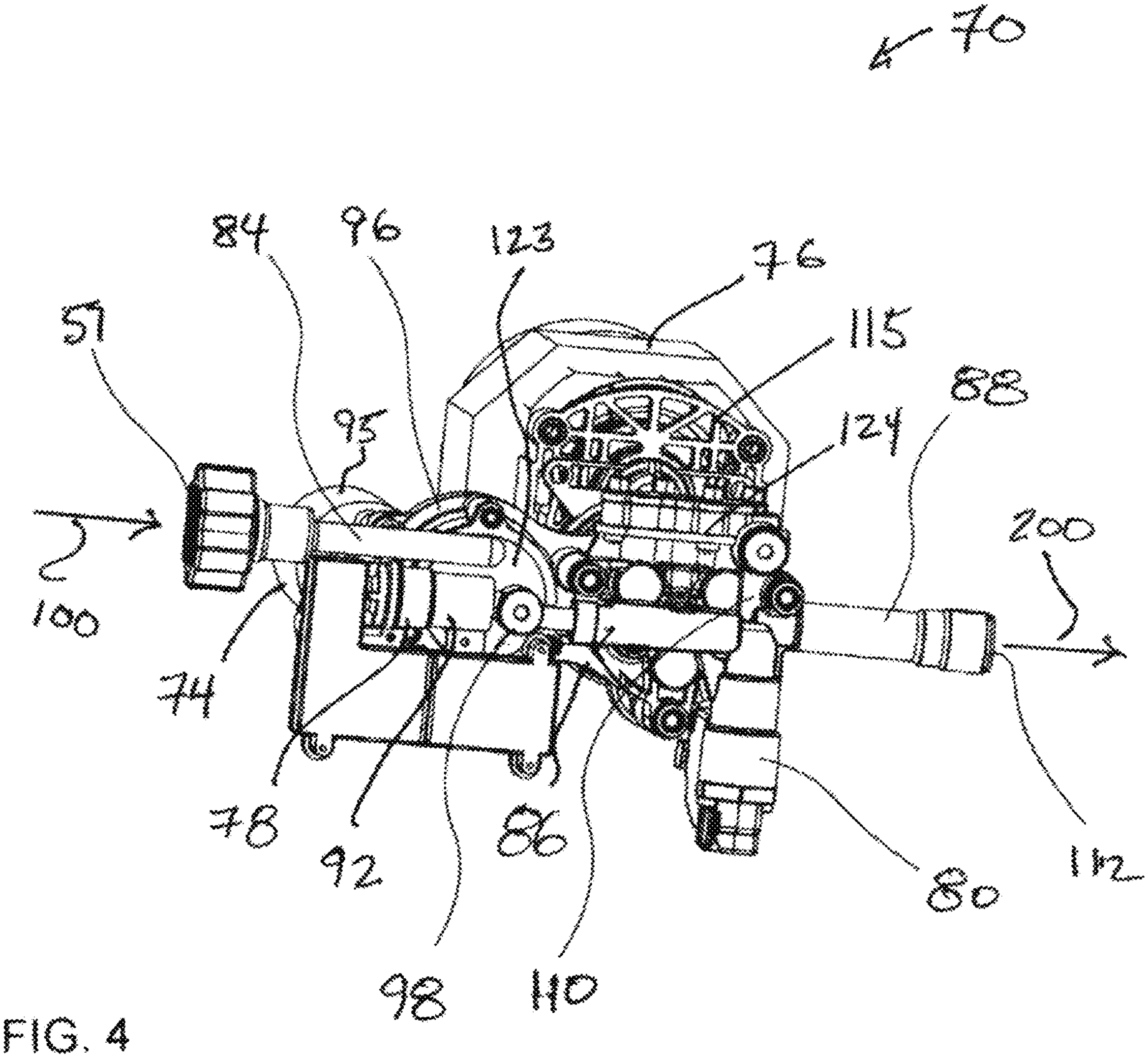

FIGS. 2 to 4 illustrate best the dual motor pump assembly 70 as including a fluid conduit assembly 72, a first pump assembly 74, a second pump assembly 76, and associated first and second valve assemblies 78,80 for receiving and conveying input fluid flow therethrough. The conduit assembly 72 is shown as including a fluid inlet conduit 84, a fluid outlet conduit 88 and an intermediate fluid conduit 86. As will be described, the inlet conduit 84 includes the water inlet port 51 which is provided with a threaded coupling 90 which for example is adapted for threaded engagement with the household garden hose or municipal water supply line for providing an input fluid flow in the direction of arrow 100 at an initial input pressure. The fluid inlet conduit 84 provides fluid communication from the threaded coupling 90 to the intermediate conduit 86 selectively either directly or via the first pump assembly 74 via the first valve assembly 78. The first pump assembly 74 includes a first pump motor 95 and first pump chamber 96. The first pump motor 95 is preferably DC operated, with power thereto supplied by the battery pack 54. In operation the pump motor 95 is operable to pressurize liquid fluid in the pump chamber 96 to an initial pressurization of about 800 to 1800 PSI, and preferably between about 1000 to 1400 PSI. FIGS. 2 and 3 show the valve assembly 78 as having a valve chamber 92 and a mechanical unloader valve 94 which is operable to selectively communicate an output end of the inlet conduit 84 either directly with the intermediate fluid conduit 86, where for example the fluid flow 100 received in the inlet port 51 flows directly into the intermediate conduit 86 unpressurized, or alternatively, into the pump chamber 96 of the first pump assembly 74. The inlet conduit 84 and unloader valve 94 are configured to permit fluid flow directly into the intermediate conduit when the first pump assembly 74 remains inactivated. A check valve 98 is preferably provided to prevent return flow. The activation of the pump assembly 74 operates to selectively open to allow fluid flow into the pump chamber 96 for pressurization, and once pressurized, therefrom past the check valve 98 and into the intermediate fluid conduit 86. By the selective operation of the pump motor 95 and unloader valve 94, the input fluid flow 100 may thus be diverted from the fluid inlet conduit 84 into the first pump chamber 96 for pressurization to a first higher pressure by the activation of a DC powered pump motor 95. The pressurized fluid in the first pump water flow moves past check valve 98 into the intermediate fluid conduit 98.

The second pump assembly 76 is shown best in FIGS. 3 and 5 to 7. The second pump assembly includes a second AC pump motor 101 and a second pump chamber 102. The second pump motor 101 is powered by the AC power input via the AC power cord 56 and controlled by the control panel 58 and controller 60.

At its outlet end, the intermediate conduit fluid 86 is provided in fluid communication, with the outlet conduit 88 via the second valve assembly 80. The second valve assembly 80 includes a mechanical unloader valve 104 and a check valve 110. The check valve 110 is configured to prevent return fluid flow from the fluid outlet conduit 88 back towards the intermediate conduit 86. The intermediate conduit 86 and unloader valve 104 are preferably configured to permit fluid flow directly from the intermediate conduit 86 into the outlet conduit 88 when the pump motor 101 remains deactivated.

On activation of the pump motor of the pump motor 101, the unloader valve 104 selectively opens to allow fluid flow into the second pump chamber 102. In the second pump chamber 102, the fluid is either initially pressurized to pressures of about 1000 and 3000 PSI, or alternatively, where pressurized fluid from the first pump assembly 74 is further pressurized by an additional 800 to 2000 PSI.

The second valve assembly 80 is thus operable to selectively communicate an output end of the intermediate conduit 86 either directly with the fluid outlet conduit 88, or alternatively, to the second pump chamber 102 of the second pump assembly via the selective operation unloader valve 104. Although not essential, a most preferred construction, each of the unloader valves 94/104, are provided as either a mechanical valve, or alternately, electromechanical or solenoid valves which are controlled in operation by the control panel 58 and controller 60 may be used.

Figure 7:
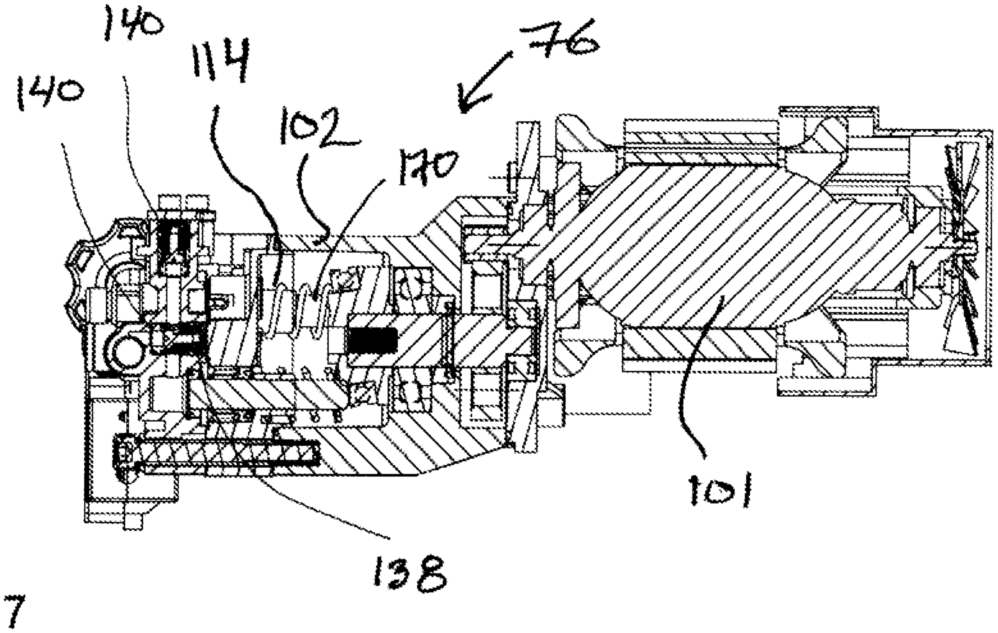
FIG. 7 is a cross-sectional view of the second pump assembly shown in FIG. 3.

The second pump assembly 76 is shown best in FIGS. 5 to 7 and is provided with an AC pump motor 101 which is operable to effect pressurization of the fluid in the second pump chamber 102 to a pressure at least equal to, and most preferably higher than the pressurization rate achieved in the first pump chamber 96. In this regard, liquid fluid flow moving from the intermediate conduit into the second pump chamber is further pressurized and flows past check valve 110 into the outlet conduit 88 and from the outlet port 112 as a high pressure flow 200.

In a preferred mode of operation, it is envisioned that the DC pump motor 95 is operable to pressurize the fluid flow in the first pump chamber to pressures in the range of about 900 to 1200 PSI under DC power operations. Fluid flow moving into the second pump chamber 102 is further pressurized by the AC pump motor 101.

It is further understood that with the present invention, the pressure washer 50 may be operated to provide a pressurized fluid flow via the outlet port 112 operating only the first pump assembly 74 in DC mode, by operating only the second pump assembly 76 in AC mode, or as a hybrid operation whereby both the first DC pump assembly 74 and the second AC pump assembly 76 are operated concurrently to provide boosted or over pressure spray.

Reference may be had to FIGS. 4 to 7 which illustrate a preferred plunger pump assembly 114 arrangement used in the dual motor pump assembly 70. The plunger pump assembly 114 includes a base 115.

The base 115 is provided with a first pump body 123 and a second pump body 124 which define pump chambers 96,102. The flow rate per unit area of the first pump body 123 is equal to the flow rate per unit area of the second pump body 124. The motor arrangement comprises the first DC pump motor 95 and the second AC pump motor 101, wherein the first pump body 123 is connected to the first DC motor 95, and the second pump body 124 is connected to the second AC motor 101. The power of the first DC motor 95 is equal to or less than that of the second AC motor 101. The first pump body 123 is equipped with a body inlet in selective communication with one end of the inlet conduit 84. The second pump body 124 is equipped with a chamber outlet in fluid communication with the outlet conduit 88.

Specifically, the first pump body 123 is equipped with a first chamber outlet, the inlet conduit 84 is provided in fluid communication with the first chamber inlet via unloader valve 94. The unloader valve 94 be provided as a mechanical unloader valve which when activated is adapted to permit fluid flow into the first pump chamber 96, on a fluid pressure in the first body pump 123 reaching a first preselected threshold pressure.

The pump chamber 96 is fluidically coupled to the second intermediate fluid conduit 86 via the check valve 98. The intermediate conduit 86 in turn is fluidically communicated with the second pump chamber 102 via unloader valve 104. In a simplified construction, unloader valve 104 may be provided as a mechanical unloader valve adapted to fluidically communicate the output end of the intermediate conduit 86 and the output conduit 86 depending on the pressure in the second pump chamber 102. The inlet conduit 84 is press-fit into the end of the intermediate conduit 86 making the connection simple and reliable, facilitating installation, disassembly, and later maintenance. The first pump body 123 and the second pump body 124 share the common base 115, and the two pump bodies 123,124 are provided fluidically in series, providing the common inlet port 51 and common outlet port 112, simplifying the layout of the hydraulic system pipeline of the entire pump assembly 70. This in turn allows the plunger pump to be made smaller in volume, more compact in structure, and convenient for movement and portability.

When high-pressure liquid outlet flow is required, the input fluid flow 100 is pressurized twice first through the first pump body 123 and then the second pump body 124, which has a higher pressure and can meet the requirements of a larger impact force for the cleaning machine. In addition, each pump body 123,124 has an associated separate motor opened in a, which allows for relatively low power requirements compared to a single motor. When used, the pressure washer 50 can be opened in a single or double, motor operation mode, resulting in less relative loss and more energy saving. It should be noted that when the first motor 95 is a DC motor, battery power is supplied from the battery pack 54; while the second pump motor 101 is an AC motor, powered by AC (mains) power. When these two motors 95,101 work together, a smaller external current can be used to achieve higher pressure while the preferred embodiment illustrates two pump assemblies 74,76 as used, the invention is not so limited. It can be understood that a third pump body can also be installed on the base 115, which is connected to the third or respective further motor. There is no specific limit on the specific number of pump bodies here.

In the preferred embodiment of the invention, the first unloader valve 94 is arranged at the connection between the fluid inlet conduit 84 and the second intermediate conduit 86. The first unloader valve 94 controls the connection or blockage between the inlet conduit 84 and the pump chamber 96 and intermediate conduit 86. When the first unloader valve 94 is unactivated, the fluid inlet conduit 84 is connected to the intermediate conduit 86 and the fluid flow moves directly therein. This situation is applicable to non high-pressure water, such as watering gardens, green belts, etc.

When the first unloader valve 94 is activated, the direct connection between the inlet conduit 84 and the second intermediate conduit 86 is blocked, and the liquid flow enters the first pump body 123 and pump chamber 96 from the inlet conduit 84 for pressurization. Fluid flow from the intermediate conduit 86 to the outlet conduit 88 is regulated by the second unloader valve 104 in a similar manner. When the second loader valve 104 is activated, the direct connection between the intermediate conduit 86 and the outlet conduit 88 is blocked, and liquid flow enters the second pump body 124 and pump chamber 102 from the intermediate conduit 86 before entering the outlet conduit 88. Movement of the water flow into the second pump body 124 allows for pressurization to higher PSI levels by virtue of the more powerful AC pump 101, before entering the outlet conduit 88. This situation is suitable for the output of high-pressure water flows, such as cleaning roads, washing cars, etc. The setting of the first loader valve 94 makes the series plunger pump more functional and has a wider range of applications.

In a most preferred embodiment of the present disclosure, the liquid inlet conduit 84 and/or first chamber inlet may be at least partially integrated with or arranged on the first end cover 115. The first pump body 123 is equipped with the first pump chamber 96, and which defines a first chamber inlet, and a first chamber outlet. The first chamber inlet and a first liquid outlet are preferably both located near the first end cover 115 and are each selectively fluidically connected to the inlet conduit 84, and intermediate conduit 86, respectively. The first pump chamber 96 is equipped with a first plunger 170, which reciprocates in the first pump chamber 96 under the drive of the first DC motor 95. When the first plunger 170 moves in the direction of the first DC motor 95, the liquid flow is drawn through the chamber inlet, and the liquid enters the first pump chamber 96. When the first plunger 130 moves towards the direction of the first end cover 115, the liquid entering the first pump chamber 96 is compressed through the chamber outlet, and into the intermediate conduit 86 past the check valve 98 and towards the outlet conduit 88.

FIGS. 5 and 6 show the second pump body 124 as having a second end cover 116, which is arranged on the side far from the second AC motor 101. The intermediate conduit 86 and/or outlet conduit 88 may be at least partially integrally formed with or arranged on the second end cover 116. The second pump body 124 is preferably equipped with a pump chamber 102 which incorporates multiple chamber cavities 122*a*, 122*b*, 122*c*. The second chamber inlet is connected to the intermediate conduit 86, and the second chamber outlet 127 is connected to the outlet conduit 88. Each of the chamber cavities 122*a*, 122*b*, 122*c*. The second pump chamber 102 is equipped with a second plunger 132, which reciprocates in the second associated pump chamber cavity under the drive of the second AC motor 101. When the first unloader valve 104 its associated pump plungers 132*a*, 132*b*, 132*c* move towards the direction of the second AC motor 101 under the drive of the second AC motor 101. Liquid in the intermediate conduit 86 is drawn into the second pump chamber 102 through the second chamber inlet port. As the pump plungers 132*a*, 132*b*, 132*c* move towards the direction of the second end cover 116. The liquid entering the second pump chamber 102 is compressed through the second chamber outlet, and then enters the outlet conduit 88 past the check valve 110, and is discharged into the spray wand assembly 52 through the main outlet port 2.

FIGS. 6 to 7 show most preferably, the second pump body 124 as having more flow per unit area. Most preferably, the three second pump cavities 122*a*, 122*b*, 122*c*, each have a corresponding associated inlet port 134 and outlet port 136. While the Figures show the first pump body 123 as equipped with at least one first pump chamber and one first plunger, and there is no limit on the specific number of first pump chambers set in the first pump body 123.

In another embodiment, a third channel may be arranged between the second liquid outlet and the liquid outlet conduit 88. The third channel may be at least partially arranged on the second end cover 115. The liquid from the second liquid outlet first enters the third channel, and then enters the liquid outlet conduit 88 through the third channel.

If the user needs to wash the car, high-pressure water needs to be used at this time. Liquid flow 100 enters the inlet conduit 86 through the threaded coupling 90 inlet port 5. The liquid flow 100 is pressurized by the first pump body 123. The fluid flow 100 flows from the inlet conduit 86 to the intermediate conduit 86, then from the intermediate conduit 86 to the second pump body 124. After being pressurized by the second pump body 124, the fluid flow flows out of the output conduit 88, and is discharged through the common outlet port 112 as in high pressure flow 200. After two pressurizations of the first pump body 123 and the second pump body 124, the output liquid flow is output at a higher pressure.

If the user needs to lower pressure or to water the flowers, normal pressure water is needed. The second unloader valve 104 is activated as for example to open a direct fluid connection, the intermediate conduit 86 and the outlet conduit 88. Water flow 100 enters the inlet conduit 84 through the threaded coupling 90. If higher pressure is needed, the water flow 100 may be pressurized to a first pressure by the first pump body 123. The pressurized flow flows from the output from the first pump chamber 102 may then directly flow from the intermediate conduit 86 to the outlet conduit 88 for discharge.

The pressure washer 30 is equipped with a control panel 58, which is divided into three positions. A first position is for the first pump body 123 to work independently, and the first position can be selected when watering flowers or where lower pressures are needed. The second position is when the second pump body 124 works alone. When the second pump body 124 works alone, the liquid enters the second pump body 124. The third operational method is when the first pump body 123 and the second pump body 124 work simultaneously, and the output liquid flow pressure is at its maximum, as for example, washing a car, deck or the like, the third gear can be selected.

Refer to FIGS. 5 to 7 to ensure the reliability of the plunger pump operation, the second inlet ports 134 are most preferably equipped with one-way valves 138, and the outlet ports 136 are equipped with second one-way valves 140. When the plungers 132*a*, 132*b*, 132*c* retract, the corresponding pump chamber cavity 122*a*, 122*b*, 122*c* generates negative pressure. At this time, the first one-way valve 138 opens, and liquid enters the corresponding pump chamber 122 from the second inlet port 134. When each plunger 132 advances and compresses, the liquid in the associate pump chamber cavity 122 is compressed. At this time, the first one-way valve 134 is closed, and the liquid is squeezed by the plunger 132 to open the second one-way valve 136 which discharges.

Figure 8:
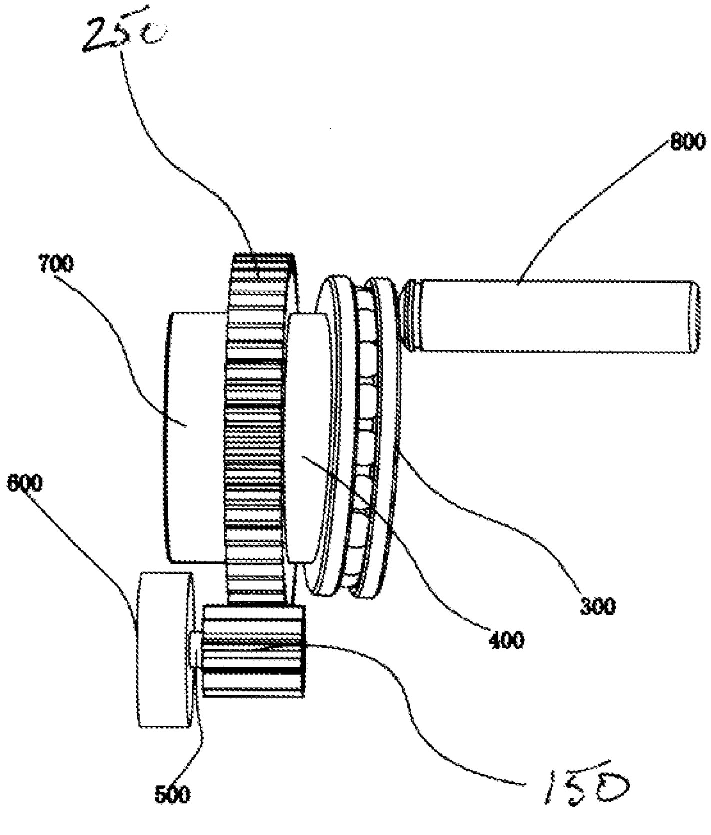
FIG. 8 is a structural schematic diagram of a transmission mechanism used in the pump assembly of FIG. 3.

Referring to FIGS. 8-9, the plunger pump assembly 114 is equipped with a transmission mechanism, which includes a driving gear 150, a driven gear 250, and a cam 400. The driving gear 150 is meshed with the driven gear 250, and the driving shaft 500 of the motor 101 is connected to the driving gear 150. The motor drives the driving gear 150 to rotate, thereby driving the rotation of the driven gear 250. The cam 400 is an oblique inclined plate structure, and the cam 400 is clamped with the driven gear 250. The rotation of driven gear 250 drives cam 400 to rotate, and the rotation of cam 400 drives the plunger to reciprocate.

In order to reduce the friction between the plunger 800 and the cam 400, the cam 400 is equipped with a first plane bearing 300. One end of the plunger 800 contacts the first plane bearing 350, and the first plane bearing 300 moves with the rotation of the cam 400. The first plane bearing 300 drives the plunger 800 to move back and forth.

Figure 14:
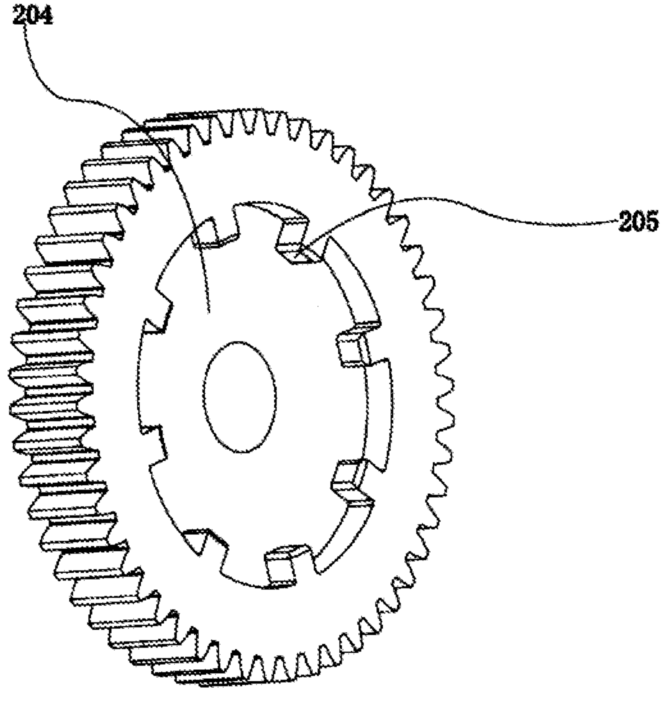
FIG. 14 is a perspective view of a driven gear used in the pump assembly of FIG. 3.
Figure 15:
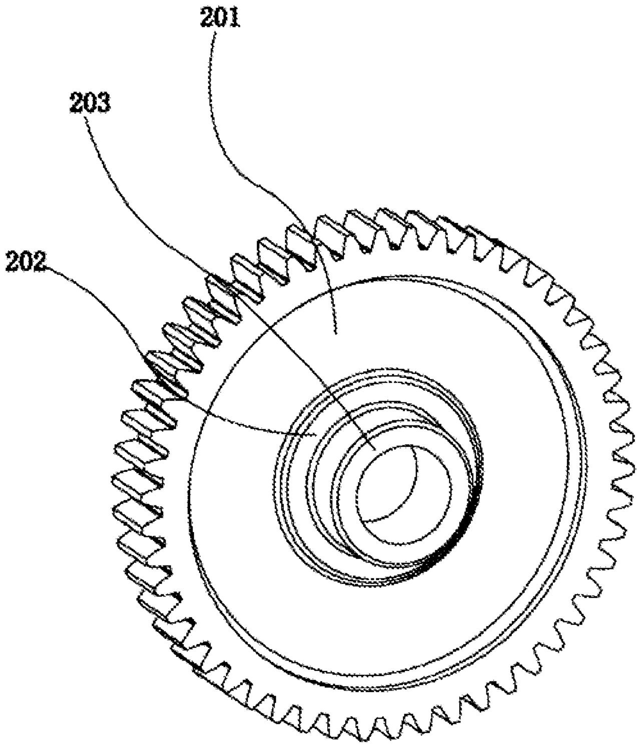
FIG. 15 is a second perspective view of the structure of the driven gear shown in FIG. 14.

As shown in FIGS. 8 and 14 to 15, the side of the driven gear 250 away from the cam 400 is connected to the first deep groove ball bearing 700. Specifically, one side of the driven gear 250 is equipped with a connecting shaft 203, and the first deep groove ball bearing 700 is in an interference fit with the connecting shaft 203. The side of the driven gear 250 near the first deep groove ball bearing 700 is provided with an inner concave 201, and an annular convex block 202 is arranged on the inner concave 201. The connecting shaft 203 is arranged on the annular convex block 202. The first deep groove ball bearing 700 includes a large ring structure and a small ring structure, and the large ring structure is arranged outside the small ring structure. The outer diameter of the annular convex block 202 is greater than or equal to the outer diameter of the small ring structure. The setting of the annular convex block 202 enables the driven gear 250 to save more raw materials and reduce processing costs.

It should be noted that there is a groove 204 on the other side of the driven gear 250, and several limit protrusions 205 are set on the inner circumference of the groove 204. A first annular protrusion is set on the side of the cam 400 near the driven gear 250, and several second card slots 403 are set on the first annular protrusion. The number and position of the limit protrusion 205 and the second card slot 403 correspond. The second card slot 403 matches the limit protrusion 205 to connect the cam 400 with the driven gear 250.

Figure 11:
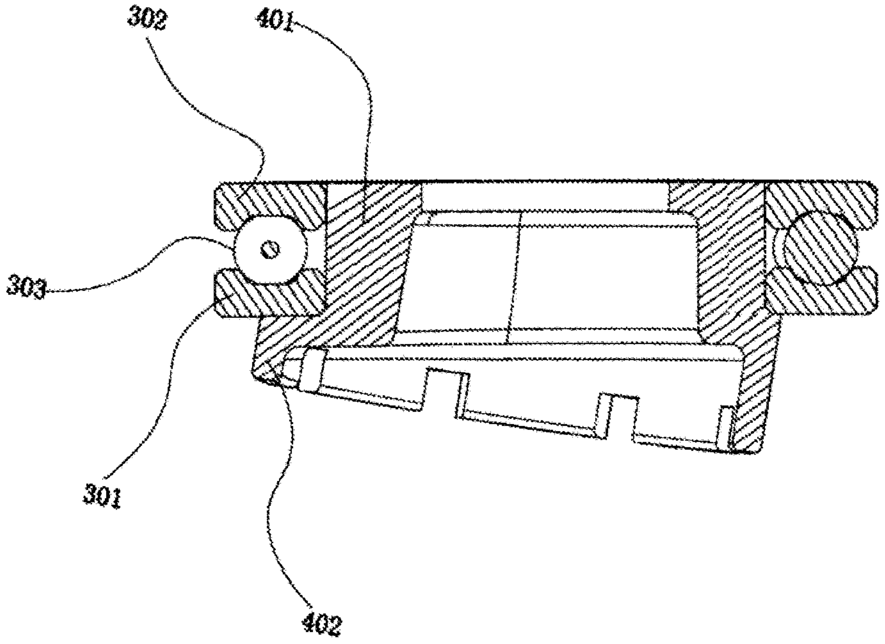
FIG. 11 is a cross-sectional view of the connection between the first planar bearing and the cam shown in FIG. 10.
Figure 12:
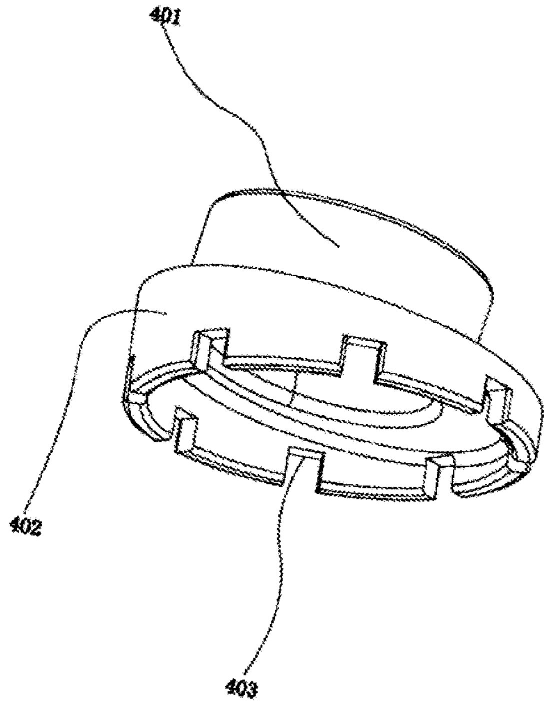
FIG. 12 is a perspective view of the cam shown in FIG. 11.
Figure 13:
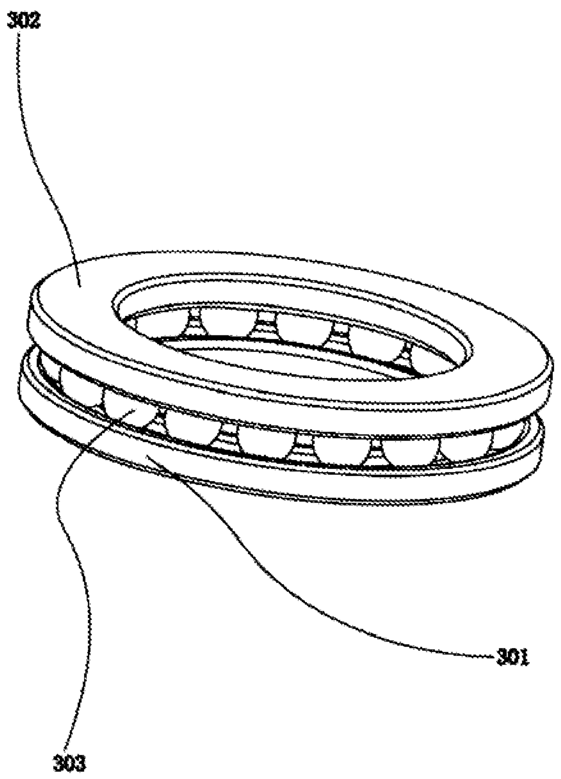
FIG. 13 is a structural schematic diagram of the first planar bearing used in the pump assembly of FIG. 3.

Specifically, the height of the first annular protrusion gradually decreases or increases in the radial direction. As shown in FIG. 11, cam 400 includes a first part 401 and a second part 402. The first part 401 is integrally formed with the second part 402, and the first part 401 is a circular structure arranged on the second part 402. The outer diameter of the circular structure is smaller than the outer diameter of the first circular protrusion, and the first circular protrusion is arranged on the second part 402.

As shown in FIGS. 10 to 13, the first planar bearing 300 includes a first annular component 301, a second annular component 302, and several balls 303. Several balls 303 are evenly distributed between the first annular component 301 and the second annular component 302. One side of the first annular component 301 is attached to the second part 402 of the cam 400, and the inner diameter of the first annular component 301 is greater than or equal to the outer diameter of the annular structure. The inner diameter of the second annular component 302 is greater than the outer diameter of the annular structure. As a preferred choice, the inner diameter of the first annular member 301 is greater than the outer diameter of the annular structure. When the inner diameter of the first annular member 301 is greater than the outer diameter of the annular structure, a gap will be formed between the first annular member 301 and the annular structure, which can reduce the friction force between the first planar bearing 300 and the cam 400. Due to the contact between the plunger 800 and the second annular component 302 and the reciprocating motion driven by the second annular component 302, when the inner diameter of the second annular component 302 is greater than the outer diameter of the annular structure, a gap will be formed between the second annular component 302 and the annular structure. During the reciprocating motion, the plunger 800 may fall into the gap. In addition, the second annular component 302 may also shake, affecting the stability of the transmission mechanism. It should be noted that during the operation of the transmission mechanism, the cam 400 drives the first annular component 301 to rotate, while the second annular component 302 can rotate or not.

FIG. 9 illustrates a preferred construction where a second deep groove ball bearing 600 is installed on the drive shaft 500 of the motor 101.

While the detailed description describes the dual motor pump assembly as being used in a pressure washer to output a high pressure water flow, the invention is not so limited. It is to be appreciated that the pump assembly may be used in a variety of different applications, including the conveyance and pressurization of a variety of types of liquid as used as other fluids.

The above has provided a detailed introduction to this application, and specific examples have been applied to explain the principles and implementation methods of this application. The explanations of the above examples are only used to help understand this application and its core ideas. It should be pointed out that for ordinary technical personnel in this field, without departing from the principles of this application, several improvements and modifications can be made which also fall within the scope of the invention.

We claim:

1. A pressure washer pump assembly comprising, first and second pump assemblies each having an associated pump chamber and being adapted to pressurize fluid therein, a conduit assembly for receiving a pressurized fluid flow therethrough, and first and second valve assemblies, the conduit assembly comprising a fluid inlet conduit, an intermediate conduit and a fluid outlet conduit, the fluid inlet conduit comprising:

an inlet end adapted for fluid communication with a water source, providing a fluid flow at an input pressure, and an output end fluidically communicating with the first valve assembly, the first valve assembly including a first valve chamber and a first valve member, the actuation of the first valve member in the first valve chamber selectively communicating the output end of the inlet conduit and an inlet end intermediate conduit either directly, wherein the fluid flow is received in the intermediate conduit substantially at the input pressure, or via the first pump chamber whereby the activation of the first pump assembly pressurizes the fluid flow received in the intermediate conduit to a first pressure higher than the input pressure, an output end of the intermediate conduit fluidically communicating with the second valve assembly, the second valve assembly including a second valve chamber and a second valve member, the actuation of the second valve member in the second valve chamber selectively communicating the output end of the intermediate conduit and an inlet end of the fluid outlet conduit either directly, wherein the fluid flow is received in the fluid outlet conduit at substantially the same pressure as in the fluid flow in intermediate conduit, or via the second pump chamber whereby activation of the second pump assembly pressurizes the fluid flow received in the fluid outlet conduit to a second pressure higher than the pressure of the fluid flow in the intermediate conduit, and a controller, the controller operable to concurrently activate the first pump assembly when the first valve member is actuated to fluidically communicate the output end of the inlet conduit with the first pump chamber.

2. The pressure washer pump assembly as claimed in claim 1, wherein the first pump assembly includes a DC pump drive motor.

3. The pressure washer pump assembly as claimed in claim 2, wherein the second pump assembly includes an AC pump drive motor.

4. The pressure washer pump assembly as claimed in claim 1, wherein the first valve member comprises a mechanical loader valve, an electromagnetic valve or a solenoid valve.

5. The pressure washer pump assembly as claimed in claim 1, wherein the second valve member comprises a mechanical loader valve, an electromagnetic valve or a solenoid valve.

6. The pressure washer pump assembly as claimed in claim 1, wherein said first pump assembly comprises a plunger pump.

7. The pressure washer pump assembly as claimed in claim 1, wherein the second pump assembly comprises a plunger pump.

8. The pressure washer pump assembly as claimed in claim 1, further wherein the controller is operable to concurrently activate the second pump assembly when the second valve member fluidically communicates the output end of the intermediate conduit with the second pump chamber.

9. The pressure washer pump assembly as claimed in claim 3, further wherein the DC pump drive motor is battery powered.

10. A pressure washer pump assembly comprising, a first pump assembly and a second pump assembly, each of the first and second pump assemblies having an associated pump chamber and a pump motor operable to pressurize fluid therein, a conduit assembly for receiving a pressurized fluid flow therethrough, and first and second valve assemblies, and a controller operable to selectively control operation of the first pump assembly pump motor and the second pump assembly pump motor either independently or in tandem, the conduit assembly comprising a fluid inlet conduit, an intermediate conduit and a fluid outlet conduit, the fluid inlet conduit comprising:

an inlet end adapted for fluid communication with a water source, providing a fluid flow at an input pressure, and an output end fluidically communicating with the first valve assembly, the first valve assembly including a first valve chamber and a first valve member operable with the selective activation of the first pump assembly pump motor to provide fluid communication with the intermediate conduit either directly with the inlet end, wherein the fluid flow is received in the intermediate conduit substantially at the input pressure, or when the first pump assembly pump motor is activated, via the first pump chamber, whereby the activation of the first pump assembly pump motor pressurizes the fluid flow received in the intermediate conduit to a first pressure higher than the input pressure, an output end of the intermediate conduit fluidically communicating with the second valve assembly, the second valve assembly including a second valve chamber and a second valve member operable with the selective activation of the second pump assembly motor to provide fluid communication with the fluid outlet conduit either directly, wherein the fluid flow is received in the fluid outlet conduit at substantially the same pressure as in the fluid flow in intermediate conduit, or when the second pump assembly pump motor is activated, via the second pump chamber, whereby activation of the second pump assembly pressurizes the fluid flow received in the fluid outlet conduit to a second pressure higher than the pressure of the fluid flow in the intermediate conduit.

11. The pressure washer pump assembly as claimed in claim 10, wherein the first pump assembly pump motor is selected as a brushed DC motor or a brushless DC motor, and the second pump assembly pump motor comprises AC pump drive motor.

12. The pressure washer pump assembly as claimed in claim 11, wherein the first valve member is selected from the group consisting of a mechanical loader valve, an electromagnetic valve and a solenoid valve, and wherein the first valve assembly includes a check valve restricting return fluid flow from said intermediate conduit into said fluid inlet conduit.

13. The pressure washer pump assembly as claimed in claim 12, wherein the second valve member is selected from the group consisting of a mechanical loader valve, an electromagnetic valve and a solenoid valve, and wherein the second valve assembly includes a check valve restricting return fluid flow from said fluid outlet conduit into said intermediate conduit.

14. The pressure washer pump assembly as claimed in claim 13, wherein said first pump assembly motor comprises a battery powered DC pump motor.

15. The pressure washer pump assembly as claimed in claim 10, wherein said first pump assembly pump motor is selected to pressurize fluid in said first pump chamber to a first pressure range selected at between about 800 and 1,400 PSI, and said second pump assembly pump motor is selected to pressurize fluid in said second pump chamber to a second pressure range, whereby when fluid is received in said intermediate conduit at the input pressure, the second pressure range being about 1,000 and 3,000 PSI and when fluid is received in said intermediate conduit at said first pressure, the second pressure range being about 800 to 2,000 PSI higher than the first pressure range.

16. The pressure washer pump assembly as claimed in claim 15, wherein the first pump assembly comprises a plunger pump actuable by the first pump assembly motor to pressurize fluid in said associated pump chamber to said first pressure range.

17. The pressure washer pump assembly as claimed in claim 3, wherein said first pump assembly pump drive motor is selected to pressurize fluid in said first pump assembly pump chamber to a first pressure range selected at between about 800 and 1,400 PSI, and said second pump assembly pump drive motor is selected to pressurize fluid in said second pump assembly pump chamber to a second pressure range, whereby when fluid is received in said intermediate conduit at the input pressure the second pressure range being about 1,000 and 3,000 PSI and when fluid is received in said intermediate conduit at said first pressure, the second pressure range being about 800 to 2,000 PSI higher than the first pressure range.

* * * * *